United States Patent
Olson

(10) Patent No.: US 7,895,390 B1
(45) Date of Patent: Feb. 22, 2011

(54) ENSURING BUFFER AVAILABILITY

(75) Inventor: Dave Olson, Palo Alto, CA (US)

(73) Assignee: QLOGIC, Corporation, Aliso Viejo, CA (US)

( * ) Notice: Subject to any disclaimer, the term of this patent is extended or adjusted under 35 U.S.C. 154(b) by 301 days.

(21) Appl. No.: 10/940,355

(22) Filed: Sep. 13, 2004

Related U.S. Application Data

(60) Provisional application No. 60/599,565, filed on Aug. 5, 2004, provisional application No. 60/574,402, filed on May 25, 2004.

(51) Int. Cl.
G06F 12/00 (2006.01)
G06F 3/00 (2006.01)
G06F 13/28 (2006.01)

(52) U.S. Cl. .................... 711/101; 710/28; 710/36; 711/E12.002

(58) Field of Classification Search ............... 711/118
See application file for complete search history.

(56) References Cited

U.S. PATENT DOCUMENTS

| | | | |
|---|---|---|---|
| 4,424,565 A | 1/1984 | Larson | |
| 5,410,326 A | 4/1995 | Goldstein | |
| 5,610,745 A * | 3/1997 | Bennett | 398/52 |
| 5,898,688 A | 4/1999 | Norton et al. | |
| 6,055,583 A | 4/2000 | Robbins | |
| 6,230,282 B1 * | 5/2001 | Zhang | 714/6 |
| 6,314,477 B1 | 11/2001 | Cowger et al. | |
| 6,430,652 B1 * | 8/2002 | Fechser et al. | 711/111 |
| 6,498,793 B1 | 12/2002 | Haviland | |
| 6,625,672 B1 * | 9/2003 | Rojemo | 710/52 |
| 6,771,569 B2 | 8/2004 | Nagata et al. | |
| 6,832,279 B1 | 12/2004 | Potter et al. | |
| 6,938,097 B1 | 8/2005 | Vincent et al. | |
| 7,058,751 B2 | 6/2006 | Kawarai et al. | |
| 7,110,363 B1 | 9/2006 | Lawrence et al. | |
| 7,120,728 B2 | 10/2006 | Krakirian et al. | |
| 7,240,350 B1 * | 7/2007 | Eberhard et al. | 719/314 |
| 7,313,643 B2 | 12/2007 | Sakurai et al. | |

(Continued)

OTHER PUBLICATIONS

"Office Action from USPTO dated Mar. 25, 2008 for U.S. Appl. No. 11/137,920".

(Continued)

*Primary Examiner*—Reginald G Bragdon
*Assistant Examiner*—Aracelis Ruiz
(74) *Attorney, Agent, or Firm*—Klein, O'Neill & Singh, LLP

(57) ABSTRACT

A buffer availability manager ensures that buffers are available before processes write thereto. The buffer availability manager maintains a plurality of register sets corresponding to the plurality of buffers. Each register set comprises a status indicator and a generation counter. Prior to writing to a buffer, the corresponding register set is read. Data is written to an individual buffer only if the status indicator indicates that the buffer is not busy, and the current value of the generation counter is not equal to a stored value from a prior register set read. The buffer availability manager detects writing of data to the buffer, and in response updates the status indicator to indicate that the buffer is busy. After processing the data in the buffer, the buffer availability manager updates the status indicator to not busy, and updates the value of the generation counter.

18 Claims, 2 Drawing Sheets

U.S. PATENT DOCUMENTS

| | | |
|---|---|---|
| 2002/0095536 A1 | 7/2002 | Emberty et al. |
| 2003/0028804 A1* | 2/2003 | Noehring et al. .............. 713/201 |
| 2003/0041176 A1 | 2/2003 | Court et al. |
| 2003/0133453 A1 | 7/2003 | Makishima et al. |
| 2003/0223433 A1 | 12/2003 | Lee et al. |
| 2004/0153619 A1* | 8/2004 | Geens et al. ................. 711/170 |
| 2004/0181635 A1* | 9/2004 | Huras et al. ................. 711/151 |
| 2005/0033874 A1 | 2/2005 | Futral et al. |
| 2005/0053070 A1 | 3/2005 | Jouppi |
| 2005/0055536 A1 | 3/2005 | Ansari et al. |
| 2005/0060443 A1 | 3/2005 | Rosner |
| 2005/0111465 A1 | 5/2005 | Stewart |
| 2005/0144310 A1 | 6/2005 | Biran et al. |
| 2005/0182886 A1 | 8/2005 | Edirisooriya et al. |
| 2005/0188209 A1 | 8/2005 | Chen et al. |
| 2005/0254514 A1 | 11/2005 | Lynn |
| 2005/0286856 A1 | 12/2005 | Aerts |
| 2006/0002556 A1 | 1/2006 | Paul |
| 2006/0133409 A1 | 6/2006 | Prakash et al. |
| 2006/0146715 A1 | 7/2006 | Supalov |
| 2007/0011560 A1 | 1/2007 | Backman et al. |

OTHER PUBLICATIONS

"Infiniband Architecture Specification vol. 1, Release 1.0.a", Infiniband Trade Association,(Jun. 19, 2001),124-140.

"Office Action from USPTO dated May 13, 2008 for U.S. Appl. No. 11/137,980".

"Office Action from USPTO dated Jul. 22, 2008 for U.S. Appl. No. 11/137,925".

"U.S. Appl. No. 11/137,920 to Olson et al.", filed May 25, 2005.

"Office Action from USPTO dated Sep. 17, 2008 for U.S. Appl. No. 10/963,287".

"Final Office Action from USPTO dated Nov. 14, 2008 for U.S. Appl. No. 11/137,920".

"Final Office Action from USPTO dated Nov. 24, 2008 for U.S. Appl. No. 11/137,980".

"Notice of Allowance from USPTO dated Jan. 27, 2009 for U.S. Appl. No. 10/963,287".

"Office Action from USPTO dated May 15, 2009 for U.S. Appl. No. 11/137,980".

"Final Office Action from USPTO dated Dec. 3, 2009 for U.S. Appl. No. 11/137,980".

"Office Action from USPTO dated Apr. 21, 2010 for U.S. Appl. No. 11/137,980".

* cited by examiner

ENSURING BUFFER AVAILABILITY

CROSS-REFERENCE TO RELATED APPLICATIONS

This application claims priority under 35 U.S.C. §119(e) from U.S. Provisional Patent Application Ser. No. 60/574,402, filed May 25, 2004, and from U.S. Provisional Patent Application Ser. No. 60/599,565, filed Aug. 5, 2004. The entirety of each of these provisional patent applications is incorporated herein by reference.

BACKGROUND

1. Field of Invention

The present invention relates generally to buffer management in a computer system, and more specifically to ensuring that a buffer in a computer system is available prior to writing data thereto.

2. Background of Invention

The speed and efficiency of an integrated circuit or computer program is affected by the number of read and write operations required to move data from a source to a destination. Such data throughput typically involves writing data to buffers, and then managing the outbound processing of that data to a destination. Because a single process typically writes to many buffers in any order, including in parallel, it is important to ensure that a buffer is available prior to writing data thereto.

Fast throughput can be especially important in hardware implementations, for example an integrated circuit for performing communication operations. Typically, before writing to a buffer on such an integrated circuit, an external process writes to a register on that circuit to indicate that the buffer is busy. After processing the buffered data, logic on the integrated circuit clears the register, indicating that the buffer is available. Thus, prior to writing to a buffer, a process can check an associated register on the circuit, to determine whether the buffer is busy or not. However, in order to allow the process to read the register and check the buffer status, the integrated circuit must be readable. This introduces latency, because read operations are more computationally expensive than write operations. For this reason, it is desirable to be able to use a write only integrated circuit, with which the above-described method cannot be used.

However, by moving the status registers to memory located off of the integrated circuit (for example, in the memory of the computing device on which the process is running), other complications are introduced. More specifically, because the buffers are typically small, they are filled with data and processed more quickly than inter-circuit communication can practicably occur. Thus, the external process writing data has no assurance that a buffer that is marked as available actually received and processed the last data written thereto. This is so because the earlier written data could still be in route from the process to the buffer, in which case it would soon arrive at the buffer and render it unavailable, despite its indicated status to the contrary.

Furthermore, even where a status register is located on the same integrated circuit as the associated buffer, the input-output bus does not necessarily guarantee that a write operation is processed before a subsequent read operation. Thus, it is possible that a process writing to a buffer marked as available lacks assurance that earlier written data is not still in route to that buffer, even where the status registers and buffers are part of the same integrated circuit.

What is needed are methods, systems and integrated circuits to ensure the availability of a buffer to a process writing thereto, whether the status register corresponding to the buffer is or is not located on the same integrated circuit (or other computing device) as the buffer, and even where that integrated circuit (or other computing device) is write only.

SUMMARY OF INVENTION

A buffer availability manager ensures that buffers are available before processes write thereto. The buffer availability manager maintains a plurality of register sets corresponding to a plurality of buffers. Each register set comprises a status indicator and a generation counter. Prior to writing to a buffer, the corresponding register set is read. Data is written to an individual buffer only if the status indicator indicates that the buffer is not busy, and the current value of the generation counter is not equal to a stored value from a prior register set read. The buffer availability manager detects writing of data to the buffer, and in response updates the status indicator to indicate that the buffer is busy. After processing the data in the buffer, the buffer availability manager updates the status indicator to indicate that the buffer is not busy, and updates the value of the generation counter.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Figure 1:
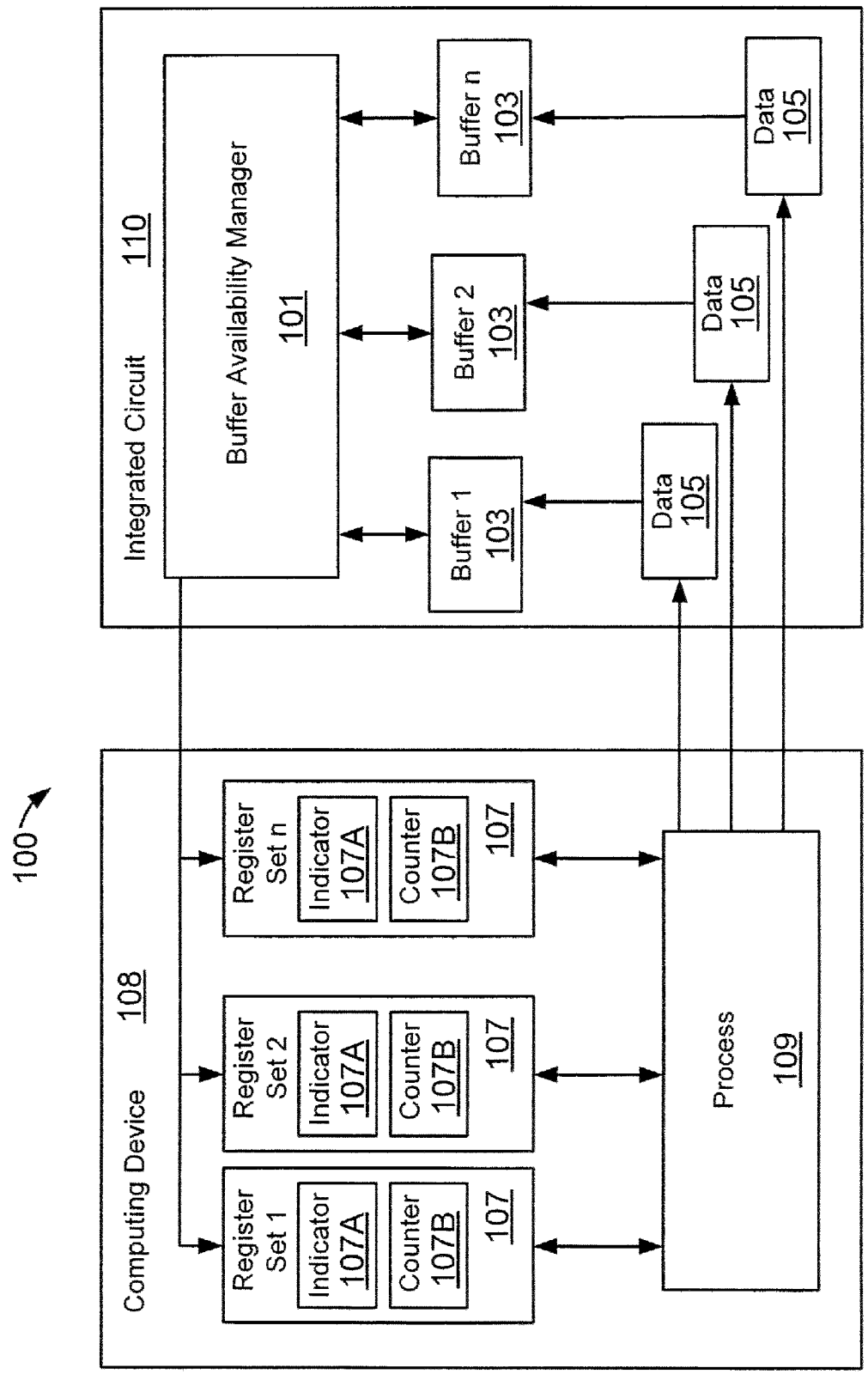
FIG. 1 is a block diagram illustrating a high level overview of a system for practicing some embodiments of the present invention.

FIG. 1 illustrates a high level overview of a system 100 for practicing some embodiments of the present invention. A buffer availability manager 101 ensures that a buffer 103 is available prior to writing data 105 thereto, according to some embodiments of the present invention. It is to be understood that although the buffer availability manager 101 is illustrated as a single entity, as the term is used herein a buffer availability manager 101 refers to a collection of functionalities which can be implemented as software, hardware, firmware or any combination of these. Where a buffer availability manager 101 is implemented as software, it can be implemented as a standalone program, but can also be implemented in other ways, for example as part of a larger program or as a plurality of separate programs. Additionally, buffers 103 can be instantiated in software, hardware, firmware or any combination of these.

As illustrated in FIG. 1, a plurality of buffers 103 are associated with a plurality of corresponding register sets 107, each register set comprising a status indicator 107A and a generation counter 107B. For ease of understanding, FIG. 1 illustrates only three buffers 103 and three register sets 107. However, it is to be understood that in some embodiments of the invention the pluralities are much larger.

In some embodiments of the present invention, the status indicator 107A is a single bit, but of course other formats are possible. In some embodiments the generation counter 107B is an integer of a certain size (e.g., represented by 4 or 8 bits) used as an actual counter. In other embodiments, the generation counter 107B is a single state bit. Other formats of generation counters 107B are possible in other embodiments of the present invention.

In some embodiments of the present invention, the register sets 107 are located in the memory of a computing device on which a process 109 writing data 105 to the buffers 103 is executing, as illustrated in FIG. 1. In other embodiments, the register sets 107 are located on an integrated circuit (or other computing device) on which the buffers 103 are located. FIG. 1 illustrates the buffers 103 instantiated as part of an integrated circuit, but it is to be understood that they can be implemented on other types of computing devices as well, such as personal computers, routers, firewalls, etc.

FIG. 1 illustrates a single process 109 writing data to a set of buffers 103. It is to be understood that in some embodiments a plurality of processes 109 write data 105, each process 109 writing data to a corresponding plurality of buffers 103, each plurality of buffers 103 being associated with a corresponding plurality of register sets 107.

Figure 2:
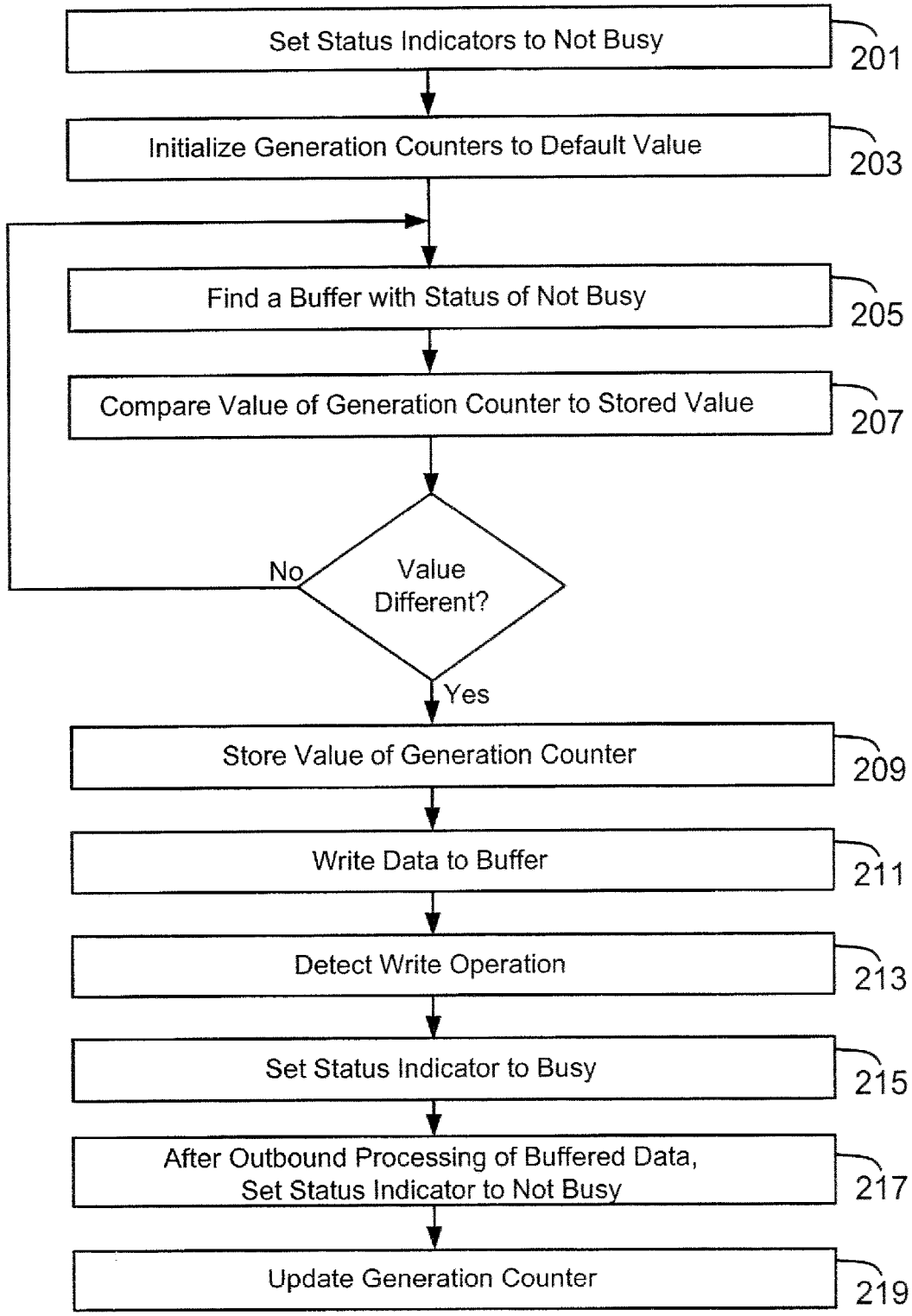
FIG. 2 is a flowchart, illustrating steps for practicing some embodiments of the present invention.

FIG. 2 illustrates steps for ensuring the availability of buffers 103 prior to writing data 105 thereto, according to some embodiments of the present invention. At initialization time, in step 201 the buffer availability manager 101 sets all status indicators 107A to not busy, and initializes all generation counters 107B to a common default value (e.g., 0) in step 203. A process 109 that wants to write data 105 to a buffer 103 finds a buffer 103 which is marked as being not busy in step 205, and compares the value of its generation counter 107B to a stored value thereof maintained by the process 109 in step 207. If the value of the generation counter 107B is different (or if the process 109 has not yet written to this buffer 103, which the process 109 can determine by maintaining an internal mechanism so indicating, such as a default initial value), the process proceeds to store the value of the generation counter 107B in step 209, and then begins to write data 105 to the buffer 103 in step 211. In some embodiments, this comprises first writing initial control data to the buffer 103, including, for example, the size of the data 105 to be written.

On the other hand, if the value of the generation counter 107B has not changed since before the process 109 last wrote to the buffer 103 (step 211), the process 109 finds another buffer 103 which is marked as being not busy (step 205), and compares the value of the generation counter 107B corresponding to that buffer 103 to its stored value (step S207).

Once a process 109 beings writing data 105 to a buffer 103, the buffer availability manager 101 detects this in step 213, and sets the status indicator 107A of that buffer to busy in step 215. Once the data 105 has been written to the buffer 103, the outbound processing of the buffer 103 contents is performed. After this, the buffer availability manager 101 sets the status indicator 107A to not busy in step 217, and updates the value of the generation counter, indicating that the buffer 103 is available in step 219. Because processes 109 do not write to a buffer 103 until confirming not only that the status Indicator 107A indicates that the buffer 103 is available, but also that the generation counter 107B has been updated since prior to the last write operation, the processes 109 are ensured of only writing to available buffers 103.

As will be understood by those familiar with the art, the invention may be embodied in other specific forms without departing from the spirit or essential characteristics thereof. Likewise, the particular naming and division of the modules, managers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, features, attributes, methodologies and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for ensuring availability of buffers prior to writing thereto, the method comprising:

(a) maintaining a plurality of register sets at a computing device executing a plurality of processes, the plurality of register sets corresponding to a plurality of buffers located at another device, each register set including a status indicator and a generation counter both used to determine if a buffer is available for writing; wherein the status indicator controlled by a buffer availability manager indicates if a buffer is busy or not busy; and the generation counter is set by the buffer availability manager to a common default value during initialization, before the plurality of buffers are made available for writing to the plurality of processes;

(b) prior to writing to any buffer from among the plurality of buffers, a process from among the plurality of processes reading the plurality of register sets to find a buffer whose corresponding register set indicates that the buffer is not busy indicating that the buffer is available;

(c) after finding the buffer that is not busy, comparing a current value of the generation counter to a stored value of the generation counter that is maintained by the process; wherein the process compares the current value to the stored value;

(d) writing data to the buffer (i) only if the status indicator for the buffer indicates that the buffer is not busy and (ii) if the current value of the generation counter is not equal to the stored value of the generation counter indicating that the generation counter has been updated since prior to a last write operation or if the process has not previously written data to the buffer, as determined by the process by maintaining an internal mechanism to indicate whether the buffer has been previously written; wherein if the generation counter value has not changed since the last write operation, the process finds another buffer for writing data;

(e) in response to the writing of data to the buffer, updating the status indicator to indicate that the buffer is busy; wherein the buffer availability manager updates the status indicator, and (f) after processing the data in the buffer, updating the status indicator to indicate that the buffer is not busy, and updating the value of the generation counter to indicate that the buffer is again available for writing; wherein the buffer availability manager updates the status indicator and the generation counter value.

2. The method of claim 1 wherein:
the register sets and buffers are located on the computing device.

3. The method of claim 1 wherein:
the register sets and the buffers are instantiated as part of an integrated circuit.

4. The method of claim 1 wherein:
the register sets and the buffers are instantiated in the other device.

5. A machine implemented method, comprising:
providing a plurality of buffers at a first device for writing data;
providing a plurality of register sets corresponding to the plurality buffers a second device executing a plurality of processes;
wherein each register set includes a status indicator and a generation counter both used to determine if a buffer from among the plurality of buffers is available for writing; and
wherein the status indicator controlled by a buffer availability manager indicates if a buffer is busy or not busy; and the generation counter is set by the buffer availability manager to a common default value during initialization, before the plurality of buffers are made available for writing to the plurality of processes;
determining if the status indicator for any buffer indicates that the buffer is not busy; wherein a process from among the plurality of processes, prior to writing to any buffer, reads the plurality of register sets to find a buffer whose corresponding register set indicates that the buffer is not busy;
maintaining a stored value for the generation counter of the register set corresponding to the buffer whose status indicator indicates that the buffer is not busy; wherein the process maintains the stored value;
comparing a current value of the generation counter to the stored value to determine if the generation counter has been updated since a last write operation performed by the process; wherein the process compares the current value to the stored value;
maintaining a mechanism to determine if the buffer has been written before by the process; wherein the process maintains the mechanism;
writing data to the buffer if the status indicator for the buffer indicates that the buffer is not busy and if the current value of the generation counter is different from the stored value of the generation counter; wherein if the generation counter value has not changed since the last write operation, the process finds another buffer for writing data;
in response to the writing of data to the buffer, updating the status indicator to indicate that the buffer is busy; wherein the buffer availability manager updates the status indicator; and
after processing the data in the buffer, updating the status indicator to indicate that the buffer is not busy, and updating the value of the generation counter to indicate that the buffer is again available for writing; wherein the buffer availability manager updates the status indicator and the generation counter value.

6. The method of claim 5, wherein data is written to the buffer if the status indicator for the buffer indicates that the buffer is not busy and if the process has not previously written data to the buffer, as determined by the mechanism.

7. The method of claim 5, wherein the plurality of buffers and the plurality of register sets are located at a same device.

8. The method of claim 5, wherein the buffer availability manager is executed by the first device.

9. The method of claim 5, wherein the buffer availability manager functionality is executed in hardware.

10. The method of claim 5, wherein the buffer availability manager functionality is executed by processor executable instructions.

11. The method of claim 5, wherein the buffer availability manager functionality is executed by a combination of hardware and processor executable instructions.

12. A system, comprising:
a plurality of buffers at a first device for writing data;
a plurality of register sets corresponding to the plurality of buffers at a second device executing a plurality of processes, where each register set includes a status indicator and a generation counter both used to determine if a buffer from among the plurality of buffers is available for writing; and
a buffer availability manager that sets the status indicator to indicate if a buffer is busy or not busy; and the generation counter to a common default value during initialization, before the plurality of buffers are made available for writing to the plurality of processes;
wherein a process from among the plurality of processes, prior to writing to any buffer, (i) reads the plurality of register sets to find a buffer whose corresponding register set indicates that the buffer is not busy; (ii) maintains a stored value for the generation counter of the register set corresponding to the buffer whose status indicator indicates that the buffer is not busy; (iii) maintains a mechanism to determine if the buffer has previously been written by the process compares a current value of the generation counter to the stored value to determine if the generation counter has been updated since a last write operation performed by the process; (iv) writes data to the buffer if the status indicator for the buffer indicates that the buffer is not busy and if the current value of the generation counter is different from the stored value of the generation counter and if the generation counter value has not changed since the last write operation, the process finds another buffer for writing data; and
wherein in response to the writing of data to the buffer, the buffer availability manager updates the status indicator to indicate that the buffer is busy; and after the data in the buffer is processed, the buffer availability manager updates the status indicator to indicate that the buffer is not busy and updates the value of the generation counter to indicate that the buffer is again available for writing.

13. The system of claim 12, wherein data is written to the buffer if the status indicator for the buffer indicates that the buffer is not busy and if the process has not previously written data to the buffer, as determined by the mechanism.

14. The system of claim 12, wherein the plurality of buffers and the plurality of register sets are located at a same device.

15. The system of claim 12, wherein the buffer availability manager is executed by the first device.

16. The system of claim 12, wherein the buffer availability manager functionality is executed in hardware.

17. The system of claim 12, wherein the buffer availability manager functionality is executed by processor executable instructions.

18. The system of claim 12, wherein the buffer availability manager functionality is executed by a combination of hardware and processor executable instructions.

* * * * *

UNITED STATES PATENT AND TRADEMARK OFFICE
CERTIFICATE OF CORRECTION

| | | |
|---|---|---|
| PATENT NO. | : 7,895,390 B1 | Page 1 of 1 |
| APPLICATION NO. | : 10/940355 | |
| DATED | : February 22, 2011 | |
| INVENTOR(S) | : Dave Olson | |

It is certified that error appears in the above-identified patent and that said Letters Patent is hereby corrected as shown below:

In column 3, line 66, delete "Indicator" and insert -- indicator --, therefor.

In column 5, line 4, in Claim 1, delete "indicator," and insert -- indicator; --, therefor.

In column 5, line 24, in Claim 5, delete "buffers" and insert -- of buffers at --, therefor.

In column 6, line 42, in Claim 12, delete "process" and insert -- process; (iv) --, therefor.

In column 6, line 45, in Claim 12, delete "(iv)" and insert -- (v) --, therefor.

Signed and Sealed this
Twenty-eighth Day of June, 2011

David J. Kappos
*Director of the United States Patent and Trademark Office*